United States Patent [19]

Lo et al.

[11] Patent Number: 5,521,003
[45] Date of Patent: May 28, 1996

[54] FLAME RETARDANT COMPOSITION

[75] Inventors: Ying-Cheng Lo, Mundelein; Ghazi M. A. Kattab, Glenview, both of Ill.

[73] Assignee: Illinois Tool Works Inc., Glenview, Ill.

[21] Appl. No.: 939,968

[22] Filed: Sep. 4, 1992

Related U.S. Application Data

[63] Continuation of Ser. No. 532,893, Jun. 4, 1990, abandoned.

[51] Int. Cl.$^6$ ............................................. C08K 5/06
[52] U.S. Cl. ...................... 428/332; 524/366; 524/411; 524/588
[58] Field of Search ............................ 524/366, 411, 524/528; 428/332

[56] References Cited

U.S. PATENT DOCUMENTS

| | | | |
|---|---|---|---|
| 3,422,047 | 1/1969 | Cannelongo | 260/28.5 |
| 3,574,164 | 4/1971 | Cyba | 260/45.75 |
| 3,639,304 | 2/1972 | Raley, Jr. | 260/2.5 FP |
| 3,640,946 | 2/1972 | Chien et al. | |
| 3,660,582 | 5/1972 | DiPietro et al. | 117/136 |
| 3,922,459 | 11/1975 | Franz et al. | 428/297 |
| 3,989,531 | 11/1976 | Orlando et al. | 106/15 FP |
| 4,089,912 | 5/1978 | Levak et al. | 260/862 |
| 4,170,711 | 10/1979 | Orlando et al. | 568/610 |
| 4,234,469 | 11/1980 | Ohta et al. | 524/411 |
| 4,259,230 | 3/1981 | Simons | 524/411 |
| 4,301,058 | 11/1981 | Neukirchen et al. | 260/40 |
| 4,319,005 | 3/1982 | Spielau et al. | 525/240 |
| 4,401,783 | 8/1983 | Kotian | 524/528 |
| 4,699,734 | 10/1987 | Kendall et al. | 524/411 |
| 4,710,317 | 12/1987 | Tabata et al. | 524/411 |
| 4,722,959 | 2/1988 | Inoue et al. | 524/411 |
| 4,729,854 | 5/1988 | Miyata et al. | 252/609 |
| 4,732,940 | 3/1988 | Yamaoka et al. | 525/240 |
| 4,822,855 | 4/1989 | Kobayashi et al. | 525/211 |
| 4,832,873 | 5/1989 | Favstritsky et al. | 252/601 |
| 4,849,134 | 7/1989 | Georlette et al. | 252/601 |

FOREIGN PATENT DOCUMENTS

| | | |
|---|---|---|
| 56-055342 | 5/1981 | Japan . |
| 61-183337 | 8/1986 | Japan . |

OTHER PUBLICATIONS

Data Sheet—Flame Retardant Polypropylene Sheet—FRPP 301–40 dated May 5, 1988, ITW Fastex.
Data Sheet—Flame Retardant Polypropylene Sheet—FRPP 301–62 dated Feb. 29, 1988—ITW Fastex.
Data Sheet—Flame Retardant Polypropylene Sheet—FRPP 301–94 dated Mar. 28, 1988—ITW Fastex.
Data Sheet—Flame Retardant Polypropylene Sheet—FRPP 301 Series dated Feb. 9, 1988—ITW Fastex.
Data Sheet—Flame Retardant Polypropylene Sheet—FRPP 301 Series Black (BK)—dated Feb. 1, 1989—ITW Fastex.
Data Bulletin—Flame Retardant Polypropylene Type PP 301—EM PEE dated Apr. 1986—Monmouth Plastics, Inc.

*Primary Examiner*—Mark D. Sweet
*Attorney, Agent, or Firm*—Schwartz & Weinrieb

[57] ABSTRACT

A non-cross-linked extrudable flame retardant composition and fabricated sheets extruded therefrom are described wherein the composition comprises a blend of polypropylene, a flame retardant and a non-vulcanized copolymer of ethylene and propylene wherein the ratio of polypropylene to copolymer is within the range of from approximately 0.5 to approximately 0.8.

28 Claims, No Drawings

FLAME RETARDANT COMPOSITION

This application is a continuation of application Ser. No. 532,893, filed Jun. 4, 1990 now abandoned.

FIELD OF THE INVENTION

This application is directed to a flame retardant composition. More particularly this application is directed to a flame retardant sheet material which includes polypropylene and copolymers of polypropylene which readily fabricate in accordance with bending, scoring and folding operations.

BACKGROUND OF THE INVENTION

Sheet materials are used as flame retardants or barriers. Of particular interest is to fabricate these sheets as a structure or part of a structure for electrical cabinets containing electrical or electronic devices. These sheets should not only be a flame retardant, but should also be an electrical insulator. Moreover, these sheets should also have the ability to form a rigid, planar or curvilinear flame retardant structure without association with any other structural material. As a result it is important that these flame retardant sheets readily fold, score and bend into fabricated structures by themselves or in association with other materials such as, for example, a metal electrical cabinet wherein the sheets form a flame retardant electrical insulator.

Heretofore polypropylene with a flame retardant component has been extruded into flame retardant sheets which have been fabricated into electrical cabinet liners or structures used to contain electrical or electronic devices. These sheets, however, have not provided for ease of fabrication, have not exhibited the requisite amount of tear resistance and have shown a proclivity to crack when scored and folded during fabrication.

OBJECTS OF THE INVENTION

It is an object of this invention to provide an extrudable flame retardant composition.

It is another object of this invention to provide a flame retardant composition which may be readily fabricated into rigid flame retardant structures.

It is yet another object of this invention to provide a flame retardant sheet which may readily be fabricated by bending, folding or scoring without deleterious effects such as, for example, cracking or tearing.

Still further objects and advantages of the invention will be derived by reference to the following detailed description.

SUMMARY OF THE INVENTION

The invention provides an extrudable flame retardant composition which is a blend of a polypropylene homopolymer, a copolymer of propylene and ethylene in a ratio of from approximately 0.5 to approximately 0.7, and a flame retardant. The composition comprises from approximately 33 to approximately 64 weight percent copolymer, from approximately 14 to approximately 23 weight percent flame retardant and from approximately 25 to approximately 45 weight percent polypropylene which upon extrusion provides a sheet material which resists cracking and tearing during fabrication. The flame retardant may be a mixture of materials and may include a synergist. Hence, the weight of the flame retardant described herein is the combined weight of the flame retardant such as, for example a halogenated organic flame retardant plus the synergist. The synergist may be a metal oxide such as, for example antimony oxide or the salt thereof such as, for example sodium antimonate. The composition of the invention provides an improved score and fold capacity with sheets having thicknesses in the range of from approximately 8 mils to approximately 100 mils. When the sheets of the invention are scored or grooved to more than approximately 10% of their thickness, but less than approximately 90% of their thickness cracking does not occur within the sheets when the sheets are folded along the score line. Moreover, the aforedescribed sheets may be folded along the score line at a speed of at least 200 degrees/second and up to approximately 2,000 degrees/second without cracking. Hence the composition of the invention provides a flame retardant sheet which may be readily fabricated without cracking. This avoids a high or unacceptable rejection rate of fabricated products which do not meet manufacturing quality assurance standards. Moreover, the composition of the invention readily extrudes without producing exuded flame retardant heat stabilizers or other additives to foul extrusion equipment including casting rolls used when the composition is extruded into sheets. Elimination of these exuded materials is an important feature of the invention because clean-up and sticking of the extruded sheets to the casting rolls are obviated with the elimination of these exuded materials. Moreover, the composition of the invention produces an improved flame retardancy of approximately VTMO (under Test UL-94) down to a sheet thickness of about 0.010" where current commercial flame retardant sheets produce a VTMO flame retardancy only with thicker sheets of approximately 0.018 inches.

DETAILED DESCRIPTION OF THE INVENTION

According to the invention an extrudable flame retardant composition comprises a blend of polypropylene, a flame retardant and a copolymer of propylene and ethylene. The polypropylene comprises from approximately 25 to approximately 45 weight percent of the composition, and most preferably from approximately 29 to approximately 34 weight percent of the composition. The copolymer comprises from approximately 33 to approximately 64 weight percent of the composition, and most preferably from approximately 45 to approximately 52 weight percent of the composition. The flame retardant comprises from approximately 14 to approximately 23 weight percent of the composition, and most preferably from approximately 18 to approximately 19 weight percent of the composition. It is important that the ratio the polypropylene to the copolymer is within the range of approximately 0.5 to approximately 0.8 weight percent, and most preferably approximately 0.6 to approximately 0.7 weight percent.

The copolymer is the reaction product of propylene and ethylene which are polymerized in a suitable or predetermined ratio and in an effective amount for providing a resulting copolymer that has a drop weight impact at approximately −20° F. of at least about 10 foot-pounds, and preferably within the range of from approximately 17 to approximately 20 foot-pounds; a notched Izod impact strength at approximately 73° F. of at least approximately 10 foot-pounds/inch (under ASTM Test D256A), and preferably within the range of from approximately 10 to approximately 15 foot-pounds/inch; a tensile stress yield of at least approximately 2,000 psi (under ASTM Test D638) and preferably approximately 4,000 psi; an elongation at yield of less than approximately 100% (under ASTM Test D638); a melt-flow rate of approximately 0.1 to approximately 2.0 dg/min., and preferably approximately 0.5 dg/min. (under ASTM Test D1238); and a density of from approximately 0.890 to approximately 0.910 g/cc, and preferably 0,897 g/cc (under ASTM Test D792A-2). Copolymers of propylene and ethylene commercially available as Pro-Fax 7723 and 7823 from Himont U.S.A. are suitable for use in the invention.

The polypropylene used in the invention may be iso- or syndio-tactic with a melt-flow rate within the range of from approximately 0.1 to approximately 2.0 dg/min. (under ASTM Test D1238(L), and preferably approximately 1.2 dg/min.; a density within the range of from approximately 0.890 to approximately 0.910 g/cc (under ASTM Test D792), and preferably approximately 0.90 g/cc; a tensile stress yield of at least approximately 3,000 psi (2"/minute) (under ASTM Test D-638-68), and preferably approximately 4,000 to approximately 5,000 psi; an elongation at yield within the range of from approximately 15 to approximately 500% (2"/minute) (under ASTM Test D-638-68); and notched Izod impact strength within the range of from approximately 0.8 to approximately 2.0 foot-pounds/inch at 73° F. (under ASTM Test D-256), and preferably approximately 1.2 foot-pounds/inch. Polypropylene suitable for use in the invention is commercially available as Escorene PP-5052 from Exxon Chemicals.

The flame retardant includes a halogenated organic flame retardant such as, for example, bis(2,3-dibromopropyl ether) of tetrabromobisphenol A, tetrabromobisphenol A-bis(2 hydroxyethyl ether), tetrabromobisphenol A-bis (allyl ether), hexabromocyclodecane, decabromodiphenyl oxide, octabromodiphenyl oxide, penta bromodiphenyl oxide, 2,4,6 tribromophenol, poly-dibromophenylene oxide, bis(tribromophenoxy) ethane, tetrabromophthalic anhydride or tetrabromophthalate diol. The halogenated flame retardant may be combined with a synergist so as to enhance the effectiveness of the halogenated organic flame retardant. The synergist may be a metal oxide such as, for example, antimony oxide or a salt such as, for example, sodium antimonate. The ratio of the halogenated organic flame retardant to the synergist is within the range of from approximately 2:1 to approximately 3:1.

The bis(2,3-dibromopropyl ether) of tetrabromobisphenol A is an important aspect of the invention and has the formula

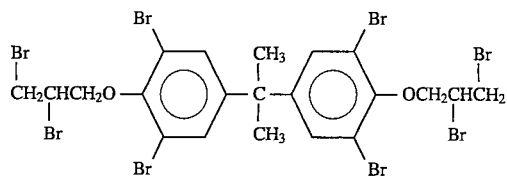

BIS(2,3-DIBROMOPROPYL ETHER)
OF TETRABROMOBISPHENOL A.

Lower alkyl groups ($C_1$ to $C_4$ chain or branched) may be substituted for one or more of the methyl groups in the bis(2,3-dibromopropyl ether) of tetrabromobisphenol A so as to provide a suitable flame retardant in the invention.

Using a combination of the bis(2,3-dibromopropyl ether) of tetrabromobisphenol A and antimony oxide is an important aspect of the invention. In this aspect the bis(2,3-dibromopropyl ether) of tetrabromobisphenol A and the antimony oxide are in a ratio within a range of from approximately 2:1 to approximately 3:1 of the ether to the antimony oxide, with the combination of the dibromopropyl ether and antimony oxide comprising from approximately 14 to approximately 23 weight percent of the composition.

The extrudable flame retardant composition, which is a blend, also advantageously includes from approximately 0.5 to approximately 1.2 weight percent, based upon the weight of the blend, a halogen heat stabilizer such as, for example, magnesium aluminum hydroxy carbonate. The halogen heat stabilizer is an acid acceptor which associates with a halogen acid formed when a halogen is released into a moist atmosphere from the halogenated flame retardant upon the exposure of the halogenated flame retardant to elevated extrusion temperatures within the range of 380° F. to 480° F. and service temperatures of approximately 200° F. at which the extruded product will be used. The association of the acid with the stabilizer reduces the exposure of the polypropylene and the copolymer to the acid and the consequent degradation therefrom. The extrudable flame retardant composition blend further advantageously includes from approximately 1.0 to approximately 2.0 weight percent, based upon the weight of the blend, of an antioxidant which generally is a sterically hindered phenol such as, for example, 2,2-bis[[3-[3,5-bis(1,1-Dimethylethyl)- 4-hydroxyphenyl]-1-oxopropoxy]methyl] 1,3-propanediyl 3,5-bis(1, 1-dimethylethyl)- 4-hydroxybenzenepropanoate.

The antioxidant reduces the tendency of the propylene and the copolymer to oxidize during extrusion at elevated temperatures.

A two-part extrudable flame retardant composition is another important aspect of the invention. In accordance with this aspect of the invention, the extrudable composition is made from two parts. A first part or Part A consists essentially of polypropylene and constitutes from approximately 28 to approximately 35 weight percent of the total extrudable composition. The second part or Part B is approximately 65 to approximately 72 weight percent of the total extrudable composition. The second part includes from approximately 65 to approximately 75 weight percent, based upon the weight of the second part, of a copolymer of propylene and ethylene and from approximately 22 to approximately 32 weight percent, based upon the weight of the second part flame retardant. The second part also may include a halogen heat stabilizer and an antioxidant in an amount effective for providing a blend of the first and second parts with from approximately 0.5 to approximately 1.2 weight percent heat stabilizer and from approximately 1.0 to approximately 2.0 antioxidant.

The second part or Part B may be used as is as a blend or it may be melt processed into pellets by means of a plasticating extruder at a temperature within the range of from approximately 380° F. to approximately 480° F. After mixing Parts A and B, the composition is extruded at a temperature within a range of from approximately 380° F. to approximately 480° F. into sheets. Thereafter the extruded sheets may be fabricated further by scoring and/or perforating the same, folding the same along the scoring lines, and bending the same into its final form. The composition of the invention may be extruded into sheets having a thickness within the range of from 8 mils to approximately 100 mils which may be scored and folded into liners for electrical boxes which liners serve not only as insulators, but also may restrain or contain sparks and resulting electrical fires. These liners may be adhesively or riveted onto the inside metal walls of the electrical cabinet or conduit.

The sheets extruded from the composition of the invention having a thickness of from approximately 8 mils to approximately 100 mils and which have been scored or grooved to a depth of from approximately 10 to approximately 90 percent of the sheet thickness will permit at least 10 foldings to be achieved at 25° C. and up to 180° along the score line without cracking. This permits a consistently higher quality fabricated product to be achieved than was heretofore permitted in accordance with the prior art.

The following example sets forth an example of the composition of the invention as well as an example of manufacturing extruded sheets from the composition.

EXAMPLE I

A mixture comprising two components is extruded and fabricated. The first component or Part A is a propylene homopolymer (PP-5052 from Exxon Chemicals) and comprises 31.3 weight percent of the total weight of the two components. The second component or Part B is 68.7 weight percent of the total weight of the two components. The second component comprises 70.83 weight percent, based upon the weight of the second component, of a non-vulcanized copolymer of propylene and ethylene (Himont 7823 available from Himont U.S.A.,); 17.89 weight percent based upon the weight of the second component, of bis(2,3-dibromopropyl ether) of tetrabromobisphenol A (commercially available from Great Lakes Chemical Corporation as PE-68); 8.95 weight percent of a antimony oxide; 0.87 weight percent of halogen heat stabilizer which is magnesium aluminum hydroxy carbonate and which has the formula Mg 4.5 $Al_2(OH)_{13}\cdot 3.5H_2O$ (commercially available as DHT 4A-2 from Mitsui & Co. (U.S.A.), Inc. or Kyowa Chem. Ind.); and 1.46 weight percent of 2,2-bis[[3-[3,5-bis(1,1-Dimethylethyl)- 4-hydroxyphenyl]-1-oxopropoxy] methyl]-1,3-propanediyl 3,5-bis(1,1-dimethyl-ethyl)-4-hydroxybenzenepropanoate as an antioxidant (commercially available as Irganox 1010 from Ciba-Geigy). The ingredients of the second component are melt blended within an extruder and pelletized at 380° to 480° F.

Parts A and B are tumbled within a tumbler at room temperature so as to form a homogeneous extrudable blend.

After mixing, the blend of Parts A and B is extruded through a 30 inch die at a thickness of approximately 16 mils at a temperature not exceeding 450° F. and preferably within the range of approximately 380° F. to approximately 420 ° F.

The resulting sheets are scored with a razor blade to approximately 40 percent of their depth and permitted to undergo ten foldings along the score line at a folding speed of at least 200 degrees/second and up to 2,000 degrees/second at room temperature (approximately 25° C.). When subjected to flame retardancy Test UL-94, the resulting sheets exhibit a flame retardancy of approximately VTMO at a sheet thickness of 0.10 inch and above.

Although the invention has been described with regard to its important features and preferred embodiments, it should be understood that various changes and modifications as would be obvious to one having ordinary skill in this art may be made without departing from the scope of the invention which is set forth in the claims appended hereto.

The various features of this invention which are believed new are set forth in the following claims.

What is claimed is:

1. A non-cross-linked extrudable flame retardant composition comprising a blend of:

from approximately 35 to approximately 55 weight percent based upon the weight of said blend of a non-vulcanized copolymer of propylene and ethylene in a ratio effective for providing a tensile stress yield of at least approximately 2,000 psi, a density within the range of from approximately 0.890 to approximately 0.910 g/cc, and a drop weight impact at approximately −20° F. of at least approximately 10 foot-pounds;

from approximately 25 to approximately 45 weight percent based upon the weight of said blend of a polypropylene which has a tensile stress yield of at least approximately 3,000 psi, a density within the range of from approximately 0.890 to approximately 0.910 g/cc, the ratio of said polypropylene to said copolymer being within the range of from approximately 0.5 to approximately 0.80; and from approximately 14 to approximately 23 weight percent based upon the weight of said blend of a flame retardant.

2. An extrudable flame retardant composition as recited in claim 1 wherein the polypropylene comprises from approximately 29 to approximately 34 weight percent of the blend, the copolymer comprises from approximately 45 to about 52 weight percent of the blend, the flame retardant comprises from approximately 18 to approximately 19 weight percent of the blend and the ratio of polypropylene to copolymer is in the range of to said from approximately 0.6 to approximately 0.7.

3. An extrudable flame retardant composition as recited in claim 1 wherein the polypropylene has a tensile stress yield in the range of from approximately 4,000 to approximately 5,000 psi and the copolymer has a tensile stress yield of at least approximately 4,000 psi and a drop weight impact in the range of approximately 17 to approximately 20 foot pounds.

4. An extrudable flame retardant resin as recited in claims 1, 2 or 3 wherein the flame retardant comprises a halogenated organic flame retardant.

5. An extrudable flame retardant resin as recited in claims 1, 2 or 3 wherein the flame retardant includes bis(2,3-dibromopropyl ether) of tetrabromobisphenol A and antimony oxide in a ratio of from approximately 2:1 to approximately 3:1 of said ether to said antimony oxide.

6. An extrudable flame retardant resin as recited in claim 5 wherein the composition further includes from approximately 0.5 to approximately 1.2 weight percent of a halogen heat stabilizer and from approximately 1.0 to approximately 2.0 weight percent of an antioxidant.

7. A two-part, non-cross-linked extrudable flame retardant composition, comprising:

from approximately 28 to 35 weight percent based upon the weight of said composition of a first part which consists essentially of polypropylene; and from approximately 65 to 72 weight percent based upon the weight of said composition of a second part;

said second part including a non-vulcanized copolymer of propylene and ethylene in a ratio effective for providing a tensile stress yield of at least 2,000 psi, a density within a range of from approximately 0.890 to approximately 0.910 g/cc, and a drop weight impact at approximately −20° F. of at least approximately 10 foot-pounds, and from approximately 22 to approximately 32 weight percent based upon the weight of said second part of a flame retardant; and said polypropylene has a tensile stress yield of at least approximately 3,000 psi, a density within the range of approximately 0.890 to approximately 0.910 g/cc, the ratio of said polypropylene to said copolymer being within the range of from approximately 0.5 to approximately 0.80.

8. A two-part composition as recited in claim 7 wherein the polypropylene has a tensile stress yield in the range of from approximately 4,000 to approximately 5,000 psi and the copolymer has a tensile stress yield of at least approximately 4,000 psi and a drop weight impact in the range of approximately 17 to approximately 20 foot pounds, and the ratio of said polypropylene to said copolymer is in the range of from approximately 0.6 to approximately 0.7 weight percent.

9. A two-part composition as recited in claim 7 or 8 wherein the flame retardant comprises a halogenated organic flame retardant.

10. A two-part composition as recited in claim 7 or 8 wherein the flame retardant includes bis(2,3-dibromopropyl ether) of tetrabromobisphenol A and antimony oxide in a ratio of from approximately 2:1 to approximately 3:1 of said ether to said antimony oxide.

11. A two part composition as recited in claim 10 wherein the second part further includes a halogen heat stabilizer and an antioxidant.

12. A flame retardant sheet having a thickness within the range of from approximately 8 mils to approximately 100 mils and extruded from a non-cross-linked blend of materials, comprising:

from approximately 35 to approximately 55 weight percent based upon the weight of said blend of a non-vulcanized copolymer of propylene and ethylene in a ratio effective for providing a tensile stress yield of at least approximately 2,000 psi, a density within the range of from approximately 0.890 to approximately 0.910 g/cc, and a drop weight impact at approximately −20° F. of at least approximately 10 foot-pounds;

from approximately 25 to approximately 45 weight percent based upon the weight of said blend of a polypropylene which has a tensile stress yield of at least approximately 3,000 psi, a density within the range of from approximately 0.890 to approximately 0.910 g/cc, the ratio of said polypropylene to said copolymer being within the range of from approximately 0.5 to approximately 0.80; and from approximately 14 to approximately 23 weight percent based upon the weight of said blend of a flame retardant.

13. A flame retardant sheet as recited in claim 12 wherein the polypropylene comprises from approximately 29 to approximately 34 weight percent of the blend, the copolymer comprises from approximately 45 to approximately 52 weight percent of the blend, the flame retardant comprises from approximately 18 to approximately 19 weight percent of the blend and the ratio of said polypropylene to said copolymer is in the range of from approximately 0.6 to approximately 0.7.

14. A flame retardant sheet as recited in claim 13 wherein the polypropylene has a tensile stress yield in the range of from approximately 4,000 to approximately 5,000 psi and the copolymer has a tensile stress yield of at least approximately 4,000 psi and a drop weight impact in the range of from approximately 17 to approximately 20 foot pounds.

15. A flame retardant sheet as recited in claims 12, 13 or 14 wherein the flame retardant comprises a halogenated organic flame retardant.

16. A flame retardant sheet as recited in claims 12, 13 or 14 wherein the flame retardant includes bis(2,3-dibromopropyl ether) of tetrabromobisphenol A and antimony oxide in a ratio of from approximately 2:1 to approximately 3:1 of said ether to said antimony oxide.

17. A flame retardant sheet as recited in claim 13 wherein the blend of materials is a blend of a two-part composition comprising:

from approximately 28 to 35 weight percent based upon the weight of the composition of a first part which consists essentially of polypropylene; and from approximately 65 to approximately 72 weight percent based upon the weight of the composition of a second part, the second part including the copolymer of propylene and ethylene and the flame retardant.

18. A flame retardant sheet as recited in claim 17 wherein the flame retardant includes bis(2,3-dibromophenyl ether) of tetrabromobisphenol A and antimony oxide in a ratio of from approximately 2:1 to approximately 3:1 of said ether to said antimony oxide.

19. A flame retardant sheet as recited in claim 18 wherein the second part further includes a halogen heat stabilizer and an antioxidant.

20. A non-cross-linked extrudable flame retardant composition, comprising a blend of:

from approximately 35–55 weight percent based upon the weight of said blend of a non-vulcanized copolymer of propylene and ethylene;

from approximately 25–45 weight percent based upon the weight of said blend of a polypropylene, the ratio of said polypropylene to said copolymer of propylene and ethylene being within the range of from approximately 0.50–0.80; and from approximately 14–23 weight percent based upon the weight of said blend of a flame retardant.

21. A flame retardant as set forth in claim 20, wherein:

said flame retardant comprises a halogenated organic flame retardant combined with a synergist which is selected from the group of antimony oxide and sodium antimonate.

22. A flame retardant composition as set forth in claim 20, further comprising:

from approximately 0.5–1.2 weight percent halogen heat stabilizer; and from approximately 1.0–2.0 weight percent antioxidant.

23. A two-part, non-cross-linked extrudable flame retardant composition, comprising:

from approximately 28–35 weight percent based upon the weight of the composition of a first part which consists essentially of polypropylene; and from approximately 65–72 weight percent based upon the weight of said composition of a second part which comprises a non-vulcanized copolymer of propylene and ethylene, and from approximately 22–32 weight percent based upon the weight of said second part of a flame retardant, the ratio of said polypropylene to said copolymer of propylene and ethylene being within the range of from approximately 0.50–0.80 weight percent.

24. A two-part composition as set forth in claim 23, wherein:

said flame retardant comprises a halogenated organic flame retardant combined with a synergist which is selected from the group of antimony oxide and sodium antimonate.

25. A two-part composition as set forth in claim 23, further comprising:

a halogen heat stabilizer and an antioxidant.

26. A flame retardant sheet having a thickness within the range of from approximately 8–100 mils and which is extruded from a non-cross-linked blend of materials, comprising:

from approximately 35–55 weight percent based upon the weight of said blend of a non-vulcanized copolymer of propylene and ethylene;

from approximately 25–45 weight percent based upon the weight of said blend of a polypropylene, the ratio of said polypropylene to said copolymer of propylene and ethylene being within the range of approximately 0.50–0.80; and from approximately 14–23 weight percent based upon the weight of said blend of a flame retardant.

27. A flame retardant sheet as set forth in claims 26, wherein:

said flame retardant comprises a halogenated organic flame retardant combined with a synergist selected from the group of antimony oxide and sodium antimonate.

28. A flame retardant sheet as set forth in claim 26, wherein said blend of materials further comprises:

a halogen heat stabilizer and an antioxidant.

* * * * *